(12) United States Patent
Zarringhalam et al.

(10) Patent No.: US 11,299,179 B2
(45) Date of Patent: Apr. 12, 2022

(54) QUALITY INDEX AND REAL-TIME FORWARD PROPAGATION OF VIRTUAL CONTROLS FOR SMART ENABLEMENT OF AUTOMATED DRIVING

(71) Applicant: GM Global Technology Operations LLC, Detroit, MI (US)

(72) Inventors: Reza Zarringhalam, Oshawa (CA); Mohammadali Shahriari, Markham (CA); Amir Takhmar, Toronto (CA); Zhi Li, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 16/814,146

(22) Filed: Mar. 10, 2020

(65) Prior Publication Data
US 2021/0284199 A1 Sep. 16, 2021

(51) Int. Cl.
*B60W 60/00* (2020.01)

(52) U.S. Cl.
CPC .... *B60W 60/0016* (2020.02); *B60W 60/0011* (2020.02); *B60W 60/0054* (2020.02)

(58) Field of Classification Search
CPC .............. B60W 60/0011; B60W 60/0054
See application file for complete search history.

(56) References Cited

U.S. PATENT DOCUMENTS

| | | | |
|---|---|---|---|
| 9,873,427 B2 * | 1/2018 | Danzl | B60W 10/04 |
| 2017/0132951 A1 * | 5/2017 | Fields | B60K 35/00 |
| 2020/0239029 A1 * | 7/2020 | Kim | G06N 3/08 |
| 2020/0369293 A1 * | 11/2020 | Jeon | B60W 60/0011 |
| 2021/0061299 A1 * | 3/2021 | Wang | B60W 50/082 |
| 2021/0129857 A1 * | 5/2021 | Cullinane | B60R 1/00 |

* cited by examiner

*Primary Examiner* — James J Lee
*Assistant Examiner* — Wenyuan Yang
(74) *Attorney, Agent, or Firm* — Vivacqua Crane PLLC

(57) ABSTRACT

A system to enable an automobile vehicle automated driving control includes a quality index of an automated driving control system prior to enablement of an automated driving control function of an automobile vehicle. An adaptive forward propagation horizon and a prediction horizon for assessment of the quality index are computed. Vehicle states and road geometry are propagated over the adaptive forward propagation horizon, and the quality index is assessed based on forward propagated states over the prediction horizon. A first signal permits actuation of the automated driving control function of the automobile vehicle and a second signal precludes actuation of the automated driving control function. One of the first signal or the second signal is elected based on the results of assessing a quality control index trajectory over the adaptive forward propagation horizon.

17 Claims, 7 Drawing Sheets

$N = f(v_x, a_x, a_y, \dot{\psi}, \frac{1}{y_l}, e_p, e_\psi, \delta, \dot{\delta}, \tau_{driver}, M)$ — 71

PERFORMANCE AND COMFORT PENALTIES — 78
- PROXIMITY TO LANE ($\frac{1}{y_l}$)
- POSITION TRACKING ERROR ($e_p$)
- HEADING TRACKING ERROR ($e_\phi$)
- CURVATURE TRACKING ERROR ($e_\rho$)
- ADJUSTED LATERAL ACCELERATION ($a_y - a_i$)
- ADJUSTED YAW RATE ($\dot{\psi} - \dot{\psi}_i$)
- LATERAL JERK ($J$)
- SIDE SLIP ($\beta$)

$P_c = [\frac{1}{y_l}\; e_p\; e_\phi\; e_\rho\; a_y - a_i\; \dot{\psi} - \dot{\psi}_i\; J\; \beta]$

ACTUATION PENALTIES — 76
- STEERING ANGLE ($\delta$)
- STEERING ANGLE RATE ($\dot{\delta}$)
- TORQUE COMMAND ($\tau$)
- TORQUE COMMAND RATE ($\dot{\tau}$)

$P_u = [\delta\; \dot{\delta}\; \tau\; \dot{\tau}]$

SAFETY EVENT PENALTIES — 74
- LANE TOUCH ($E_T$)
- TORQUE METRIC VIOLATION ($E_{TM}$)
- EXCESSIVE TORQUE ($E_\tau$)
- LATERAL ACCELERATION VIOLATION ($a_y$)
- LATERAL COLLISION ($E_{LC}$)
- SEVERE OSCILLATION ($E_0$)

$P_S = [E_T\; E_{TM}\; E_\tau\; E_{a_y}\; E_{LC}\; E_0]$ $Q = \sum_{k=N}^{0} (P_C^T R P_C + P_U^T U P_U + P_S^T S P_S)$ — 72, 80, 84, 88, 86

$U = \begin{bmatrix} u_2 & 0 & 0 & 0 \\ 0 & u_2 & 0 & 0 \\ 0 & 0 & u_3 & 0 \\ 0 & 0 & 0 & u_4 \end{bmatrix}$ $S = \begin{bmatrix} \infty & 0 & 0 & 0 & 0 & 0 \\ 0 & \infty & 0 & 0 & 0 & 0 \\ 0 & 0 & \infty & 0 & 0 & 0 \\ 0 & 0 & 0 & \infty & 0 & 0 \\ 0 & 0 & 0 & 0 & \infty & 0 \\ 0 & 0 & 0 & 0 & 0 & \infty \end{bmatrix}$ — 82

$R = \begin{bmatrix} r_2 & 0 & 0 & 0 & 0 & 0 & 0 & 0 \\ 0 & r_2 & 0 & 0 & 0 & 0 & 0 & 0 \\ 0 & 0 & r_3 & 0 & 0 & 0 & 0 & 0 \\ 0 & 0 & 0 & r_4 & 0 & 0 & 0 & 0 \\ 0 & 0 & 0 & 0 & r_5 & 0 & 0 & 0 \\ 0 & 0 & 0 & 0 & 0 & r_6 & 0 & 0 \\ 0 & 0 & 0 & 0 & 0 & 0 & r_7 & 0 \\ 0 & 0 & 0 & 0 & 0 & 0 & 0 & r_8 \end{bmatrix}$ — 90

$N = f(v_x, a_x, a_y, \dot{\psi}, \frac{1}{y_l}, e_p, e_\psi, e_\rho, \delta, \dot{\delta}, \tau_{driver}, M)$

104 — PERFORMANCE AND COMFORT PENALTIES
- PROXIMITY TO LANE ($\frac{1}{y_l}$)
- POSITION TRACKING ERROR ($e_p$)
- HEADING TRACKING ERROR ($e_\psi$)
- CURVATURE TRACKING ERROR ($e_\rho$)
- ADJUSTED LATERAL ACCELERATION ($a_y - a_{yl}$)
- ADJUSTED YAW RATE ($\dot{\psi} - \dot{\psi}_l$)
- LATERAL JERK ($J$)
- SIDE SLIP ($\beta$)

110 — ACTUATION PENALTIES
- STEERING ANGLE ($\delta$)
- STEERING ANGLE RATE ($\dot{\delta}$)
- TORQUE COMMAND ($\tau$)
- TORQUE COMMAND RATE ($\dot{\tau}$)

108 — SAFETY EVENT PENALTIES
- LANE TOUCH ($E_T$)
- VDTOM VIOLATION ($E_{VDTOM}$)
- EXCESSIVE TORQUE ($E_\tau$)
- LATERAL ACCELERATION VIOLATION ($a_y$)
- LATERAL COLLISION ($E_{LC}$)
- SEVERE OSCILLATION ($E_\theta$)

$P_C = [\frac{1}{y_l}\ e_p\ e_\psi\ e_\rho\ a_y - a_{yl}\ \dot{\psi} - \dot{\psi}_l\ J\beta]$ — 112

$P_u = [\delta\ \dot{\delta}\ \tau\ \dot{\tau}]$ — 114

$P_S = [E_T\ E_{VDTOM}\ E_\tau\ E_{a_y}\ E_{LC}\ E_\theta]$

106 — $Q = \sum_{k=N}^{0} (P_C^T R P_C + P_U^T U P_U + P_S^T S P_S)$ — 118, 122

124 — $R = \begin{bmatrix} r_1 & 0 & 0 & 0 & 0 & 0 & 0 & 0 \\ 0 & r_2 & 0 & 0 & 0 & 0 & 0 & 0 \\ 0 & 0 & r_3 & 0 & 0 & 0 & 0 & 0 \\ 0 & 0 & 0 & r_4 & 0 & 0 & 0 & 0 \\ 0 & 0 & 0 & 0 & r_5 & 0 & 0 & 0 \\ 0 & 0 & 0 & 0 & 0 & r_6 & 0 & 0 \\ 0 & 0 & 0 & 0 & 0 & 0 & r_7 & 0 \\ 0 & 0 & 0 & 0 & 0 & 0 & 0 & r_8 \end{bmatrix}$

120 — $U = \begin{bmatrix} u_1 & 0 & 0 & 0 \\ 0 & u_2 & 0 & 0 \\ 0 & 0 & u_3 & 0 \\ 0 & 0 & 0 & u_4 \end{bmatrix}$

116 — $S = \begin{bmatrix} \infty & 0 & 0 & 0 & 0 & 0 \\ 0 & \infty & 0 & 0 & 0 & 0 \\ 0 & 0 & \infty & 0 & 0 & 0 \\ 0 & 0 & 0 & \infty & 0 & 0 \\ 0 & 0 & 0 & 0 & \infty & 0 \\ 0 & 0 & 0 & 0 & 0 & \infty \end{bmatrix}$ $r_i < u_i \ll s_i$

FIG. 8

QUALITY INDEX AND REAL-TIME FORWARD PROPAGATION OF VIRTUAL CONTROLS FOR SMART ENABLEMENT OF AUTOMATED DRIVING

INTRODUCTION

The present disclosure relates to automobile vehicles having automated driving systems and control systems to initiate automated driving systems.

Automobile vehicle automated driving control systems are commonly initiated when vehicle driving conditions such as vehicle stability within a driving lane are established and confirmed. Conservative design criteria leads to frequent "inhibit" signals being generated which prevent initiation of the automated driving system. Driver override systems permitting initiation are sub-optimal because feedback to the vehicle operator commonly results in generation of flickering indication lights or a system "unavailable" message which may cause vehicle operator confusion or dissatisfaction. Multiple operator attempts to initiate operation of the automobile vehicle automated driving control system may therefore be required.

Thus, while current automobile vehicle automated driving control systems achieve their intended purpose, there is a need for a new and improved system and method for smart enablement of an automobile vehicle automated driving control system.

SUMMARY

In one aspect of the present disclosure, a system to enable an automobile vehicle automated driving control includes a quality index of the automated driving control system applied prior to enablement of the automated driving control function of an automobile vehicle. An adaptive horizon for assessment of the quality index is computed. The vehicle states and road geometry are propagated over the adaptive horizon, and the quality index is assessed based on forward propagated states over the prediction horizon. A first signal permits actuation of the automated driving control function of the automobile vehicle and a second signal precludes actuation of the automated driving control function. One of the first signal or the second signal is elected based on the results of assessing a quality index trajectory over the adaptive forward propagation horizon.

In another aspect of the present disclosure, the quality index includes weighted penalties assigned to variables when calculating the quality index. The weighted penalties are grouped into three categories including: a first category defining multiple safety event penalties applied to multiple safety event elements; a second category defining multiple actuation penalties applied to multiple actuation elements; and a third category defining multiple performance and comfort penalties applied to multiple performance and comfort elements.

In another aspect of the present disclosure, the safety event penalties have weighting factors assigned to the safety event elements higher than weighting factors assigned to the actuation penalties.

In another aspect of the present disclosure, the actuation penalties have weighting factors assigned to the actuation penalty elements higher than weighting factors assigned to the performance and comfort elements.

In another aspect of the present disclosure, a virtual controller provides real-time calculation of vehicle position, roadway curvature and steering angle which are included in the generation of the vehicle adaptive forward propagation horizon.

In another aspect of the present disclosure, a position control utilizes multiple vehicle position inputs to generate a virtual vehicle position signal forwarded to a virtual curvature control.

In another aspect of the present disclosure, the virtual curvature control generates a virtual curvature control signal which is forwarded to a virtual steering angle control, the virtual steering angle control generating a virtual steering angle signal applied to generate the vehicle forward propagation over adaptive horizon.

In another aspect of the present disclosure, the vehicle adaptive forward propagation horizon is predicted for multiple "N" future predicted vehicle positions defining predicted forward moving positions of the automobile vehicle over a predetermined window of time.

In another aspect of the present disclosure, a value of the "N" future predicted vehicle positions is calculated as a function of multiple variables, including a vehicle velocity, and a vehicle forward and lateral acceleration.

In another aspect of the present disclosure, the multiple variables include a yaw rate, a lane proximity, a curvature tracking error, a yaw rate error, a steering angle, a steering angle rate and a torque commanded.

According to several aspects, a method to enable an automobile vehicle automated driving control includes: performing an assessment applying a quality index of an automated driving feature prior to enablement of an automated driving control function of an automobile vehicle; calculating a quality index based on propagated vehicle states and road geometry, calculating a trajectory of the quality index over a forward propagation horizon, and electing between permitting actuation of an automated driving control function of the automobile vehicle and precluding actuation of the automated driving control function based on the assessment of the quality index trajectory.

In another aspect of the present disclosure, the method further includes actuating a switch to request initiation and operation of the automated driving control function; and conducting in parallel a vehicle model data generation, a road geometry data generation, a driver input collection and a vehicle parameters collection.

In another aspect of the present disclosure, the method further includes collecting the data from the vehicle model data generation, the road geometry data generation, the driver input collection and the vehicle parameters collection together with data from multiple automobile vehicle dynamics sensors; and applying the collected data during the calculating the adaptive forward propagation horizon.

In another aspect of the present disclosure, the method further includes performing the assessment applying the quality index over a predetermined time window; and performing a quality index rate matrix generation over a moving time window.

In another aspect of the present disclosure, the method further includes forwarding a change of the quality index and a rate of change of the quality index to a decision-making block, wherein in the decision-making block, a first determination is made if an absolute value of the change of the quality index is less than a first threshold $\beta_1$ and a second determination is made if an absolute value of the rate of change of the quality index is less than a second threshold $\beta_2$, and a third determination is made to identify if the rate of change of the quality index is also negative definite.

In another aspect of the present disclosure, the method further includes generating an allowing controls signal which permits actuation of the automated driving control function if the first determination identifies the absolute value of the change of the quality index is less than the first threshold $\beta_1$ and the second determination identifies the absolute value of the rate of change of the quality index is less than the second threshold $\beta_2$ and the third determination identifies the rate of change of the quality index is also negative definite.

In another aspect of the present disclosure, the method further includes generating an inhibit controls signal which prohibits actuation of the automated driving control function if any one or all of the first determination identifies the absolute value of the change of the quality index is equal to or greater than the first threshold $\beta_1$, the second determination identifies the absolute value of the rate of change of the quality index is equal to or greater than the second threshold $\beta_2$ OR the third determination identifies the rate of change of the quality index is not negative definite.

According to several aspects, a method to enable an automobile vehicle automated driving control includes: requesting initiation and operation of an automated driving control function of an automobile vehicle; conducting in parallel a vehicle model data generation, a road geometry data generation, a driver input collection and a vehicle parameters collection; applying the vehicle model data generation, the road geometry data generation, the driver input collection and the vehicle parameters collection in a quality index; calculating an adaptive forward propagation horizon of the automobile vehicle based on calculated results of the quality index; and electing between permitting actuation of the automated driving control function of the automobile vehicle and precluding actuation of the automated driving control function based on assessment of the quality index over the adaptive forward propagation horizon.

In another aspect of the present disclosure, the method further includes predicting the vehicle adaptive forward propagation horizon for multiple "N" future predicted positions of the automobile vehicle over a predetermined window of time.

In another aspect of the present disclosure, the method further includes calculating a value of the "N" future predicted positions of the automobile vehicle as a function of multiple variables, including vehicle performance constraints generated from data of a vehicle dynamics model, safety constraints, and actuation constraints.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a diagrammatic presentation of the elements used in generation of a Quality Index (Q) used to predict quality of controls for the system of FIG. 1;

FIG. 8 is a flow diagram of the method steps for operating the system of FIG. 1;

DETAILED DESCRIPTION

The following description is merely exemplary in nature and is not intended to limit the present disclosure, application, or uses.

Figure 1:
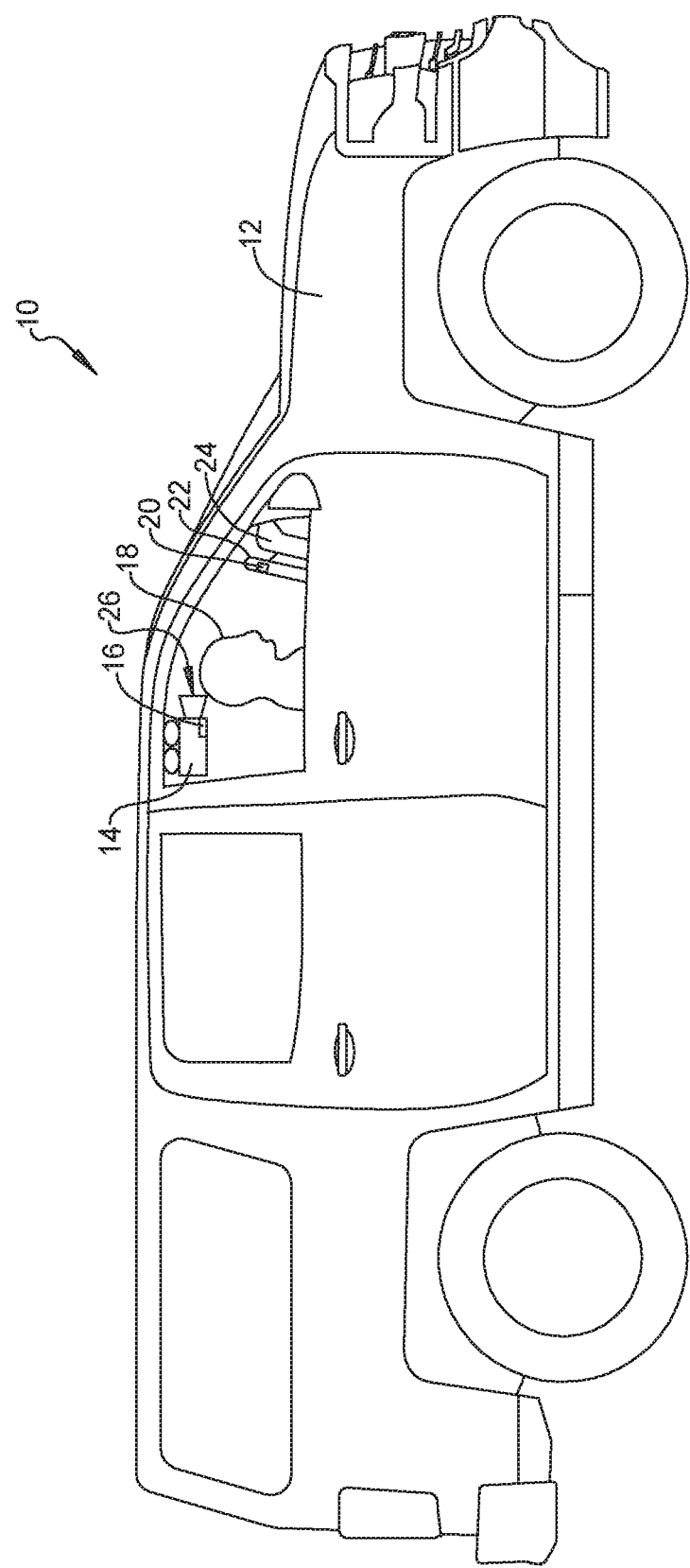
FIG. 1 is a side elevational view of an automobile vehicle having a system for smart enablement of an automobile vehicle automated driving control according to an exemplary aspect.
Figure 2A:
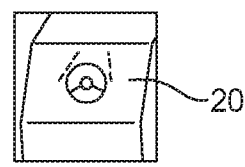
FIG. 2A is a front elevational view of a switch for actuating the system of FIG. 1.
Figure 2B:
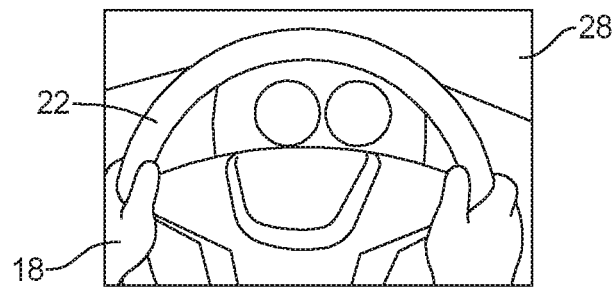
FIG. 2B is a rear perspective view of an interior vehicle configuration having the system of FIG. 1.
Figure 2C:
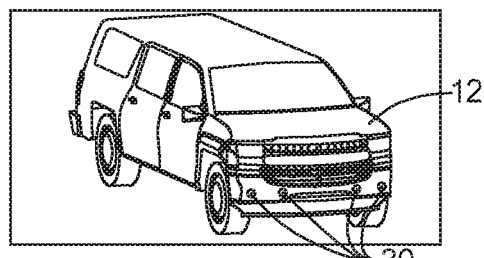
FIG. 2C is a front perspective view of an automobile vehicle having the system of FIG. 1.
Figure 2D:
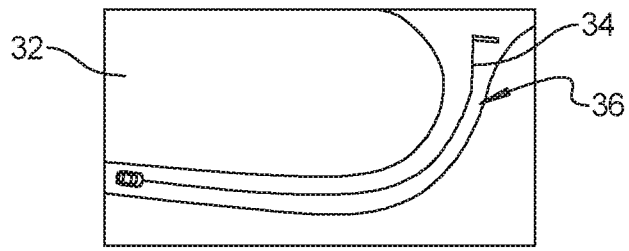
FIG. 2D is a top plan view of a curving vehicle roadway having a roadway map path data plot for the system of FIG. 1.
Figure 2E:
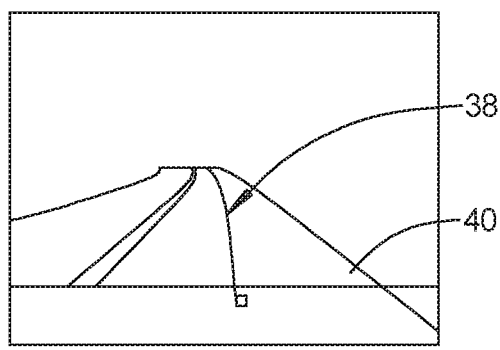
FIG. 2E is a rear perspective view of a vehicle roadway having a virtual center lane generated by the system of FIG. 1.

Referring to FIG. 1, a system for smart enablement of an automobile vehicle automated driving control 10 is provided for an automobile vehicle 12, having a controller 14 receiving vehicle input data and applying a quality index described in greater detail in reference to FIG. 8 to predict if vehicle conditions at a requested initiation time of an automobile vehicle automated driving control function 16 for automatically controlling operation of the automobile vehicle 12 satisfy predetermined thresholds. Initially, an operator 18 actuates a switch 20 to request initiation and operation of the automated driving control function 16. The request for initiation and operation of the automated driving control function 16 is forwarded to the controller 16. The switch 20 may be positioned in multiple different locations within the automobile vehicle 12 including on a steering wheel 22 or on a dashboard 24. At least one camera 26 can also be incorporated into the automobile vehicle 12 and provide camera image data input to the controller 16.

Referring to FIG. 2 and again to FIG. 1, upon receipt of the request for initiation and operation of the automated driving control function 16 following actuation of the switch 20, the controller 14 further receives roadway visual data forwarded to the controller 14 from the at least one camera 26, analyzes multiple operator inputs 28 which are described in greater detail below, receives and analyzes data from multiple automobile vehicle dynamics sensors, collectively identified as dynamics sensors 30, applies roadway data 32 including global positioning system (GPS) data, roadway map path data 34 and roadway curvature data 36, and generates a target path 38 onto a virtual roadway image 40 using data including data from the camera 26.

Referring to FIG. 3 and again to FIG. 2, vehicle dynamics characteristics are obtained from a vehicle dynamics model 42 using data obtained from the dynamics sensors 30, which can include accelerometers, angle sensors, proximity sensors and the like. The vehicle dynamics model 42 can generate data such as a yaw rate 44, a lateral acceleration 46 and a steering angle 48, as well as a heading tracking error, a curvature tracking error, a lateral jerk, and the like.

Figure 3:
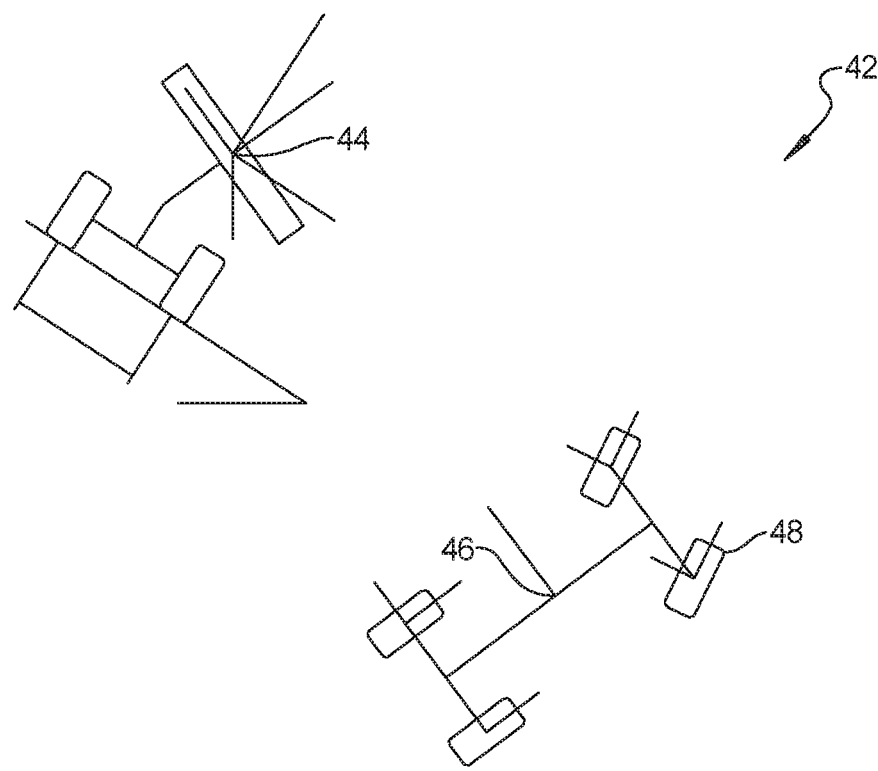
FIG. 3 is a perspective view of a vehicle dynamics model for the system of FIG. 1.

Referring to FIG. 4 and again to FIGS. 2 and 3, a virtual path planner 50 applies a preview distance 52 for an instantaneous or present vehicle path 54 of the automobile vehicle 12. The virtual path planner 50 calculates a vehicle virtual path 56 for the automobile vehicle 12 applying vehicle operating conditions and roadway characteristics.

Figure 4:
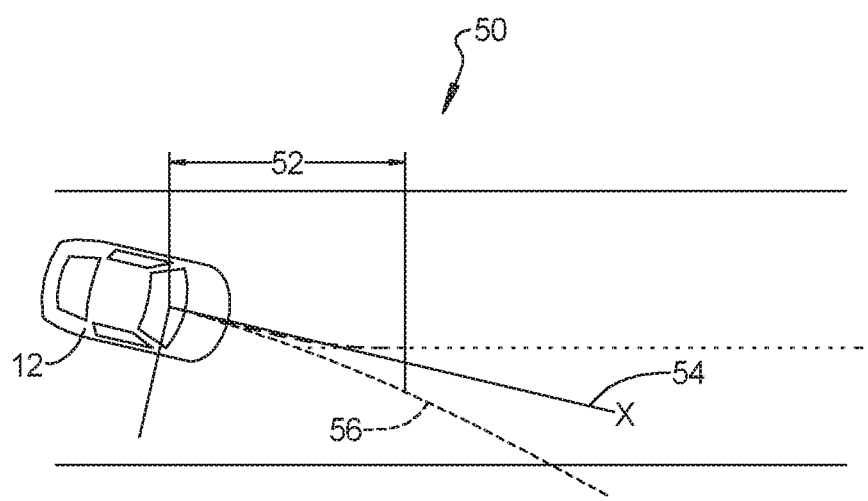
FIG. 4 is a top plan view of a virtual path planner of the system of FIG. 1.
Figure 5:
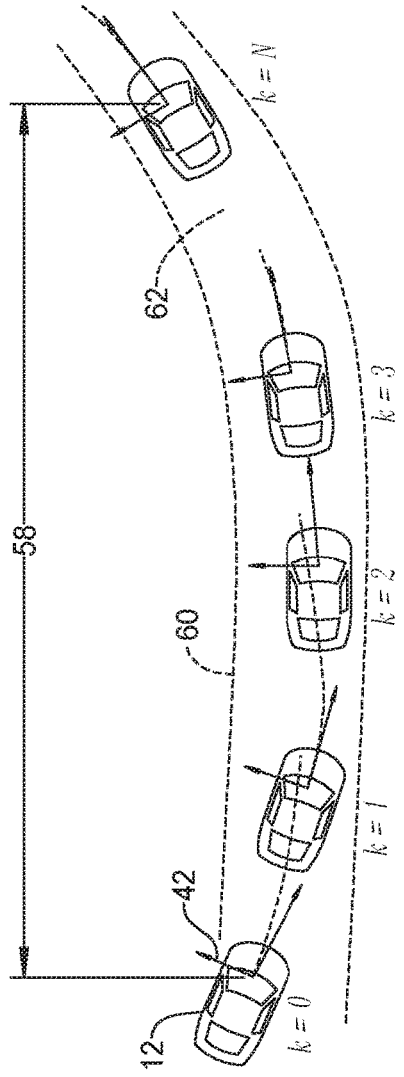
FIG. 5 is a top plan view of a vehicle adaptive forward propagation over a propagation horizon generated by the system of FIG. 1.

Referring to FIG. 5 and again to FIGS. 1 through 4, the vehicle dynamics characteristics described in reference to FIG. 4 and the output from the virtual path planner 50 described in reference to FIG. 4 are applied to predict a forward propagation of vehicle trajectory over an adaptive horizon 58. The vehicle adaptive forward propagation prediction horizon 58 is predicted for and represents multiple "N" future predicted positions of the automobile vehicle 12 over a predetermined window of time, for example for a time of one second. A quantity of the "N" future predicted positions is calculated as a function 71 described in greater detail in reference to FIG. 7, and can vary depending on multiple criteria including a vehicle velocity, a vehicle forward and lateral acceleration, a yaw rate, a lane proximity, a curvature tracking error, a yaw rate error, a steering angle, a steering angle rate, a torque commanded, the vehicle performance constraints generated from the data of the vehicle dynamics model 42, safety constraints which are described below, actuation constraints which are described below and event constraints such as the geometry of a roadway 60 as the automobile vehicle 12 is projected to travel along the roadway 60 with respect to an optimal path defined by a lane centerline 62. In the example of FIG. 5, an instantaneous vehicle position (k=0) is provided for an exemplary point of actuation of the switch 20, and a quantity of four future predicted positions (k=1, k=2, k=3, k=n) of the automobile vehicle 12 are shown which are immediately generated at the time of actuation of the switch 20.

Figure 6:
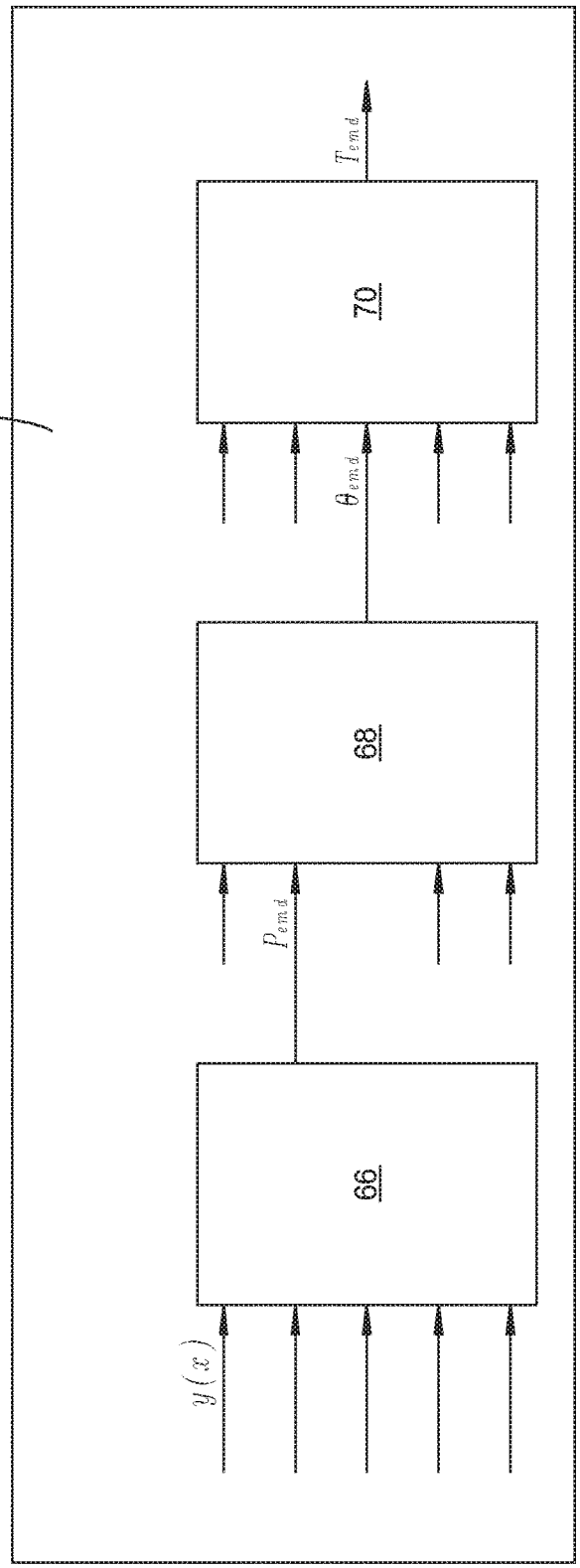
FIG. 6 is a flow diagram of a virtual controller of the system of FIG. 1.

Referring to FIG. 6 and again to FIGS. 1 through 5, a virtual controller 64 also provides down-sampling for a cloned, real-time calculation of vehicle position, roadway curvature and steering angle which are included in the generation of the vehicle adaptive forward propagation over the prediction horizon 58. Down-sampling allows a sampling frequency to be controlled, thereby limiting processor run time and resources. For example, A position control 66 utilizes multiple vehicle position inputs to generate a virtual vehicle position signal which is forwarded to a virtual curvature control 68. The virtual curvature control 68 generates a virtual curvature control signal which is forwarded to a virtual steering angle control 70. The virtual steering angle control 70 generates a virtual steering angle signal applied to generate the vehicle adaptive forward propagation horizon 58.

Referring to FIG. 7 and again to FIGS. 1 through 6, as previously noted herein the vehicle adaptive forward propagation horizon 58 is predicted for multiple "N" future predicted vehicle positions represented by predicted forward moving positions of the automobile vehicle 12 over a predetermined window of time. A quantity of the "N" future predicted vehicle positions is calculated as a function 71 of multiple vehicle variables as shown, the multiple variables including a vehicle velocity, a vehicle forward and lateral acceleration, a yaw rate, a lane proximity, a curvature tracking error, a yaw rate error, a steering angle, a steering angle rate and a torque commanded. The quantity of "N" future predicted vehicle positions changes during vehicle operation and is determined by vehicle operating conditions at the time the operator actuates the switch 20. For example, if the roadway is straight, vehicle lateral acceleration is substantially zero, and the factors used to generate "N" are unchanging, as few as two data points for "N" may be acceptable to identify the feasibility of initiating the automated driving control function 16. If conditions are varying, for example in an "S" turn of the roadway, with accelerations changing, and other vehicle operating conditions changing, multiple data points, for example ten data points for "N" may be used.

The "N" quantity is also applied to identify a Quality Index (Q) 72 used to assess quality of the controls during predicted vehicle future positions based on predetermined time intervals of vehicle travel and if actuation of the automated driving control function 16 is permitted. Weighted penalties are assigned to different variables when calculating the Quality Index 72, which are grouped into three categories discussed below.

A first category defines multiple Safety Event Penalties 74 having safety event elements, including but not limited to a lane touch event, a velocity-dependent steering metric violation event, an excessive torque event, a lateral acceleration violation event, a lateral collision event and a severe oscillation event. Detection of any one of the Safety Event Penalties 74 generates a signal precluding initiation of the automated driving control function 16.

A second category of weighted penalties defines a group of Actuation Penalties 76. The Actuation Penalties 76 have intermediate weighting factors for the actuation penalty elements lower than the weighting factors of the Safety Event Penalty elements. The Actuation Penalty elements can include, but are not limited to a steering angle, a steering angle rate, a torque command and a torque command rate, individually assigned a predetermined threshold. Initiation of the automated driving control function 16 is permitted if the thresholds of the Safety Event Penalties 74, the thresholds of the Actuation Penalties 76 and if the predetermined thresholds of the Performance and Comfort Penalty elements described below are not exceeded.

A third category of weighted penalties defines a group of Performance and Comfort Penalties 78. The Performance and Comfort Penalties 78 have weighing factors lower than the weighting factors of the actuation penalty factors and are thereby the lowest weighting factors of the three penalty groups. The Performance and Comfort Penalty elements can include, but are not limited to a lane proximity, a position tracking error, a heading tracking error, a curvature tracking error, an adjusted lateral acceleration, an adjusted yaw rate, a lateral jerk and a side slip, individually assigned a predetermined threshold lower than the thresholds of the Actuation Penalties elements. Initiation of the automated driving control function 16 is permitted if the thresholds of the Safety Event Penalties 74, the thresholds of the Actuation Penalties 76 and if the predetermined thresholds of the Performance and Comfort Penalty elements are not exceeded.

The Quality Index (Q) 72 is calculated based on equation 1 below:

$$Q = \sum_{0}^{k=N} (P_C^T R P_C + P_U^T U P_U + P_S^T S P_S)$$

In the above equation 1 and with continuing reference to FIG. 8, a third term 80 of the Quality Index 72 equation incorporates the Safety Event Penalties 74, with the "S" term denoting a weight factor assigned to the safety penalties determined from a table 82 having values of either zero (0) or infinity (∞), such that the presence of any one of the Safety Event Penalties 74 which are weighted to infinity results in the Quality Index (Q) 72 being raised to infinity which as noted above generates a signal precluding initiation of the automated driving control function 16. The Ps term of the Quality Index 72 equation defines a safety event weight matrix, and the $P_{TS}$ term of the Quality Index 72 equation defines a transposition of the safety event weight matrix.

A second term 84 of the Quality Index 72 equation similarly incorporates the Actuation Penalties 76, with the term "U" denoting a weight factor assigned to the actuation penalties determined from a table 86. The $P_U$ term of the Quality Index 72 equation defines an actuation weight matrix, and the $P_{TU}$ term of the Quality Index 72 equation defines a transposition of the actuation weight matrix.

A third term 88 of the Quality Index 72 equation similarly incorporates the Performance and Comfort Penalties 78, with the term "R" denoting a weight factor assigned to the performance and comfort penalties determined from a table 90. The Pc term of the Quality Index 72 equation defines a performance and comfort weight matrix, and the $P_{TC}$ term of the Quality Index 72 equation defines a transposition of the performance and comfort weight matrix.

Referring to FIG. 8 and again to FIGS. 1 through 7, a flow diagram 92 presenting method steps for operating the system for smart enablement of an automobile vehicle automated driving control 10 of the present disclosure includes multiple steps as follows. In an initiation step 94, the operator 18 actuates the switch 20 to request initiation and operation of the automated driving control function 16. Following the initiation step 94 a vehicle model data generation step 96 is conducted. In parallel with the vehicle model data generation step 96, a road geometry data generation step 98, a driver input collection step 100 and a vehicle parameters collection step 102 are conducted. Data from the previous steps and in a data collection step 104 data collected from the multiple automobile vehicle dynamics sensors, collectively identified as dynamics sensors 30 is applied in the generation of the vehicle adaptive forward propagation horizon 58.

Following generation of the vehicle adaptive forward propagation horizon 58 and further using data collected from the previous steps 96, 98, 100, 102 a quality index matrix generation step 106 is performed over a predetermined time window, which is followed by performance of a quality index rate matrix generation step 108 over a moving time window. A change of a quality index $\tilde{Q}_{\Delta T}$ 110 and a rate of change of the quality index $\dot{Q}_{\Delta T}$ 112 are forwarded to a decision-making block 114. In the decision-making block 114, a first determination 116 is made if an absolute value of the change of the quality index $\tilde{Q}_{\Delta T}$ 110 is less than a first threshold $\beta_1$ and a second determination 118 is made if an absolute value of the rate of change of the quality index $\dot{Q}_{\Delta T}$ 112 is less than a second threshold $\beta_2$. A third determination 120 is then made to identify if the rate of change of the quality index $\dot{Q}_{\Delta T}$ 112 is also negative definite.

If the first determination 116 identifies the absolute value of the change of the quality index $\tilde{Q}_{\Delta T}$ 110 is less than the first threshold $\beta_1$ and the second determination 118 identifies the absolute value of the rate of change of the quality index $\dot{Q}_{\Delta T}$ 112 is less than the second threshold $\beta_2$ AND the third determination 120 identifies the rate of change of the quality index $\dot{Q}_{\Delta T}$ 112 is also negative-definite an allow controls signal 122 is generated which permits actuation of the automated driving control function 16. If any one or all of the first determination 116 identifies the absolute value of the change of the quality index $\tilde{Q}_{\Delta T}$ 110 is equal to or greater than the first threshold $\beta_1$, the second determination 118 identifies the absolute value of the rate of change of the quality index $\dot{Q}_{\Delta T}$ 112 is equal to or greater than the second threshold $\beta_2$ OR the third determination 120 identifies the rate of change of the quality index $\dot{Q}_{\Delta T}$ 112 is NOT negative-definite an inhibit controls signal 124 is generated which prohibits actuation of the automated driving control function 16.

Referring to FIG. 9 and again to FIGS. 1 through 8, at the instant the switch 20 is depressed, in a stable driving condition shown, approximately three data points for "N" predict the automobile future positions within a window of time does not violate any of the predetermined thresholds. The window of time can vary and may be for example 3 msec up to approximately 2 sec. The Quality Index 72 identifies acceptable conditions for initiating the automated driving control function 16.

Figure 9:
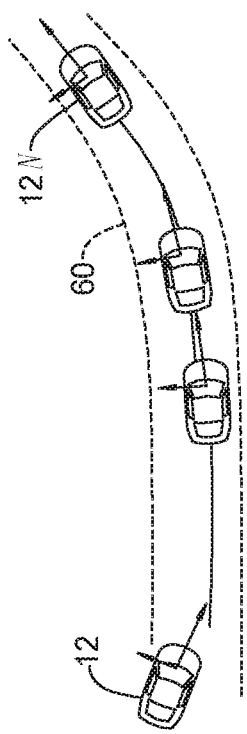
FIG. 9 is a top plan view of the quality index trajectory over the adaptive forward propagation horizon presenting stable driving conditions for initiation of an automobile vehicle automated driving control function.
Figure 10:
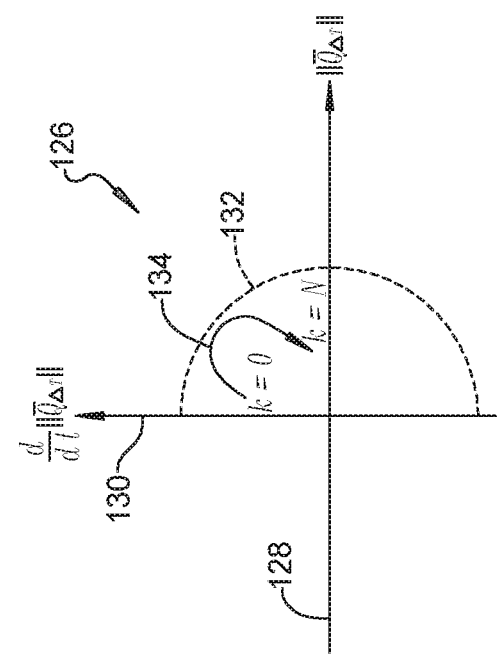
FIG. 10 is a diagrammatic presentation of the vehicle adaptive forward propagation horizon of FIG. 9.

Referring to FIG. 10 and again to FIG. 9, a visual representation of the conditions of FIG. 9 is presented. A graph 126 presents normalized values 128 of the change of the quality index matrix $\tilde{Q}_{\Delta T}$ 110 plotted against normalized values 130 of the rate of change of the quality index $\dot{Q}_{\Delta T}$ 112. A predetermined quality index margin 132 is plotted, against which the instantaneous calculated Quality Index 72 is plotted. Because the values for the k=0 to k=N generated during the calculation of the Quality Index 72 are within or less than the range of values of the predetermined quality index margin 132, the allow controls signal 122 is generated which permits actuation of the automated driving control function 16.

Referring to FIG. 11 and again to FIG. 9, at the instant the switch 20 is depressed, in an unstable driving condition shown, approximately four data points "N" predict the automobile future positions within a window of time violates one or more of the predetermined thresholds. The Quality Index 72 identifies unacceptable conditions for initiating the automated driving control function 16.

Figure 11:
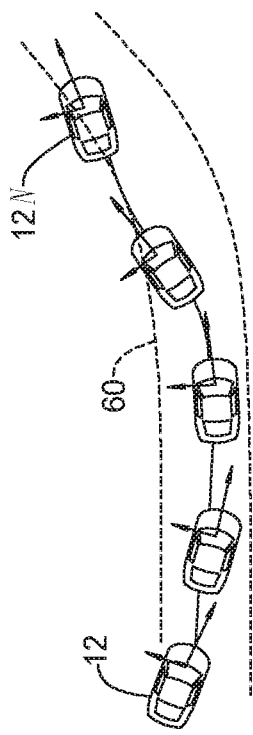
FIG. 11 is a top plan view of the quality index trajectory over the adaptive forward propagation horizon presenting unstable driving conditions which preclude initiation of the automobile vehicle automated driving control function.
Figure 12:
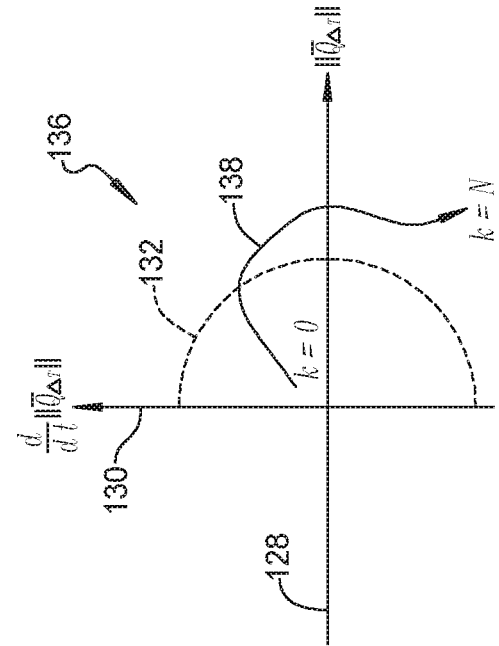
FIG. 12 is a diagrammatic presentation of the vehicle adaptive forward propagation horizon of FIG. 11.

Referring to FIG. 12 and again to FIG. 11, a visual representation of the conditions of FIG. 11 is presented. A graph 136 presents the normalized values 128 of the change of the quality index matrix $\tilde{Q}_{\Delta T}$ 110 plotted against the normalized values 130 of the rate of change of the quality index matrix $\dot{Q}_{\Delta T}$ 112. The predetermined quality index margin 132 is plotted, against which the instantaneous calculated Quality Index 72 is plotted. Because the values for the k=0 to k=N generated during the calculation of the Quality Index 72 extend beyond the range of values of the predetermined quality index margin 132, the inhibit controls signal 124 is generated which prohibits actuation of the automated driving control function 16.

A method for smart enablement of an automobile vehicle automated driving control 10, includes: performing an assessment applying the Quality Index 72 prior to enablement of the automated driving control function 16 of the automobile vehicle 12; calculating the vehicle adaptive forward propagation horizon 58 of the automobile vehicle 12; and electing between permitting actuation of the automated driving control function 16 of the automobile vehicle 12 and precluding actuation of the automated driving control function 16 based on the calculated results of the Quality Index 72.

A system for smart enablement of an automobile vehicle automated driving control 10 of the present disclosure offers several advantages. These include provision of a stability and quality assessment prior to automated driving enablement, provision of a quality index based on performance, actuation, safety and event constraints, provision of an adaptive horizon for forward propagation of the automobile vehicle to ensure accuracy and save computation throughput based on the driving scenario, down-sampling and cloning a path planning. The advantages further include provision of controls for virtual assessment of quality and controls stability, provision of real-time forward propagation of vehicle dynamics, road, planning, and controls, provision of an assessment of a quality index over a propagation horizon for feature enablement, use of the quality index to allow feature enablement, and use of the quality index to allow transition from driver override to automated control.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system to enable an automobile vehicle automated driving control in an automobile vehicle, comprising:
   a switch configured to enable the automobile vehicle automated driving control; and
   a controller in communication with the switch, the controller configured to:
      determine a quality index of an automated driving control system of the automobile vehicle applied prior to enablement of the automated driving control function of the automobile vehicle;
      calculate an adaptive forward propagation horizon of the automobile vehicle, wherein the adaptive forward propagation horizon is predicted for multiple "N" future predicted vehicle positions represented by predicted forward moving positions of the automobile vehicle over a predetermined window of time, and wherein a value of the "N" future predicted vehicle positions is calculated as a function of a vehicle velocity, a vehicle forward acceleration, a vehicle lateral acceleration, a road geometry, and lane markings;
      determine an assessment of the quality index over the adaptive forward propagation horizon; and
      generate a first signal permitting enablement of the automated driving control function of the automobile vehicle and a second signal precluding enablement of the automated driving control function, one of the first signal or the second signal elected based on the assessment of the quality index over the adaptive forward propagation horizon.

2. The system to enable the automobile vehicle automated driving control of claim 1, wherein the quality index includes weighted penalties assigned to variables when calculating the quality index, the weighted penalties grouped into three categories including:
   a first category defining multiple safety event penalties applied to multiple safety event elements;
   a second category defining multiple actuation penalties applied to multiple actuation elements; and
   a third category defining multiple performance and comfort penalties applied to multiple performance and comfort elements.

3. The system to enable the automobile vehicle automated driving control of claim 2, wherein the safety event penalties have safety event penalty weighting factors and the actuation penalties have actuation penalty weighting factors, and wherein the safety event penalty weighting factors are greater than the actuation penalty weighting factors.

4. The system to enable the automobile vehicle automated driving control of claim 3, wherein the performance and comfort penalties have performance and comfort weighting factors and the actuation penalty weighting factors are greater than the performance and comfort weighting factors.

5. The system to enable the automobile vehicle automated driving control of claim 1, further including a virtual controller providing real-time calculation of vehicle states including position, heading, and steering angle and path following curvature included in the calculation of the vehicle adaptive forward propagation over the prediction horizon.

6. The system to enable the automobile vehicle automated driving control of claim 5, further including a tracking control utilizing multiple vehicle state inputs to generate a virtual vehicle state horizon signal forwarded to a virtual curvature control.

7. The system to enable the automobile vehicle automated driving control of claim 6, further including a virtual steering angle control, and wherein:
   a virtual curvature control signal is generated by the virtual curvature control and forwarded to the virtual steering angle control; and
   a virtual steering angle signal is generated by the virtual steering angle control and applied to calculate the vehicle forward propagation over adaptive horizon.

8. The system to enable the automobile vehicle automated driving control of claim 1, wherein the value of the "N" future predicted vehicle positions is further calculated as a function of a yaw rate, a lane proximity, a curvature tracking error, a yaw rate error, a steering angle, a steering angle rate and a torque commanded.

9. A method to enable an automobile vehicle automated driving control in an automobile vehicle, comprising:
   actuating, by a user of the automobile vehicle, a switch to enable the automated driving control function;
   performing, by a controller, an assessment applying a quality index of an automated driving feature prior to enablement of the automated driving control function of an automobile vehicle;
   calculating, by the controller, an adaptive forward propagation horizon and an adaptive horizon of the automobile vehicle having multiple "N" future predicted states of the automobile vehicle including positions of the automobile vehicle over a predetermined window of time;
   propagating, by the controller, a road geometry for the "N" future predicted states of the automobile vehicle; and
   electing, by the controller, between permitting enablement of the automated driving control function and precluding enablement of the automated driving control function based on the multiple "N" future predicted states of the automobile vehicle in the adaptive forward propagation horizon.

10. The method to enable the automobile vehicle automated driving control of claim 9, further including:
conducting in parallel with actuating the switch a vehicle model data generation, a road geometry data generation, a driver input collection and a vehicle parameters collection.

11. The method to enable the automobile vehicle automated driving control of claim 10, further including:
collecting data from the vehicle model data generation, the road geometry data generation, the driver input collection and the vehicle parameters collection together with sensor data from multiple automobile vehicle dynamics sensors; and
applying the data and the sensor data during the calculating the adaptive forward propagation and the adaptive horizon.

12. The method to enable the automobile vehicle automated driving control of claim 11, further including:
performing the assessment applying the quality index over a predetermined time window; and
performing a quality index rate matrix generation over a moving time window.

13. The method to enable the automobile vehicle automated driving control of claim 12, further including forwarding a change of the quality index and a rate of change of the quality index to a decision-making block, wherein in the decision-making block, a first determination is made if an absolute value of the change of the quality index is less than a first threshold $\beta_1$ and a second determination is made if an absolute value of the rate of change of the quality index is less than a second threshold $\beta_2$, and a third determination is made to identify if the rate of change of the quality index is also negative definite.

14. The method to enable the automobile vehicle automated driving control of claim 13, further including generating an allow controls signal which permits enablement of the automated driving control function if the first determination identifies the absolute value of the change of the quality index is less than the first threshold $\beta_1$ and the second determination identifies the absolute value of the rate of change of the quality index is less than the second threshold $\beta_2$ and the third determination identifies the rate of change of the quality index is also negative definite.

15. The method to enable the automobile vehicle automated driving control of claim 13, further including generating an inhibit controls signal which prohibits enablement of the automated driving control function if any of the first determination identifies the absolute value of the change of the quality index is equal to or greater than the first threshold $\beta_1$, the second determination identifies the absolute value of the rate of change of the quality index is equal to or greater than the second threshold $\beta_2$ or the third determination identifies the rate of change of the quality index is not negative definite.

16. A method to enable an automobile vehicle automated driving control in an automobile vehicle, comprising:
actuating, by a user of the automobile vehicle, a switch to enable the automated driving control function;
conducting in parallel, by a controller, a vehicle model data generation, a road geometry data generation, a driver input collection and a vehicle parameters collection;
applying, by the controller, the vehicle model data generation, the road geometry data generation, the driver input collection and the vehicle parameters collection in a quality index;
calculating, by the controller, an adaptive forward propagation horizon of the automobile vehicle, wherein the adaptive forward propagation horizon is predicted for multiple "N" future predicted vehicle positions represented by predicted forward moving positions of the automobile vehicle over a predetermined window of time;
assessing, by the controller, the quality index over the adaptive forward propagation horizon; and
electing, by the controller, between permitting enablement of the automated driving control function and precluding enablement of the automated driving control function based on the results of the assessing of the quality index.

17. The method to enable the automobile vehicle automated driving control of claim 16, further including calculating a value of the "N" future predicted states of the automobile vehicle as a function of multiple variables, the multiple variables including vehicle performance constraints generated from data of a vehicle dynamics model, safety constraints, and actuation constraints.

* * * * *